United States Patent [19]

Fukuda et al.

[11] Patent Number: 4,765,052

[45] Date of Patent: Aug. 23, 1988

[54] METHOD OF FITTING RUBBER STOPPERS ON WIRES

[75] Inventors: Michio Fukuda, Osaka; Eiji Fudo, Yokkaichi; Koichi Tani, Yokkaichi; Haruhito Kobayashi, Yokkaichi, all of Japan

[73] Assignees: Sumitomo Electric Industries, Ltd.; Sumitomo Wiring Systems, both of Japan

[21] Appl. No.: 944,674

[22] Filed: Dec. 19, 1986

Related U.S. Application Data

[62] Division of Ser. No. 722,228, Apr. 11, 1985, Pat. No. 4,653,182.

[30] Foreign Application Priority Data

Apr. 17, 1984 [JP] Japan ................................. 59-77392
Apr. 17, 1984 [JP] Japan ............................. 59-56391[U]
Apr. 17, 1984 [JP] Japan ............................. 59-56393[U]

[51] Int. Cl.$^4$ ............................................. B23P 11/02
[52] U.S. Cl. ........................................ 29/450; 29/235; 29/809
[58] Field of Search ................. 29/450, 235, 754, 784, 29/785, 792, 809

[56] References Cited

U.S. PATENT DOCUMENTS

| | | | |
|---|---|---|---|
| 2,551,652 | 5/1951 | Vreeland | 29/235 |
| 2,657,454 | 11/1953 | Hayett | 29/450 |
| 2,683,924 | 7/1954 | Schryver | 29/754 |
| 2,746,079 | 5/1956 | Zell | 29/450 UX |
| 2,853,770 | 9/1958 | Thorn et al. | 29/450 UX |
| 3,802,071 | 4/1974 | Shannon | 29/450 X |
| 3,807,021 | 4/1974 | Birkett | 29/754 |

*Primary Examiner*—Charlie T. Moon
*Attorney, Agent, or Firm*—Harness, Dickey & Pierce

[57] ABSTRACT

A method of fitting a rubber stopper for a water-proof connector terminal onto an end portion of an electric wire includes the steps of: successively feeding a group of rubber stoppers aligned in a row in a state wherein each of the rubber stoppers has its longitudinal axis extending vertically; transferring each of the rubber stoppers into a stopper housing portion; retaining the electric wire disposed on an imaginary line passing through the center of the stopper housing portion; and press-fitting the wire into the rubber stopper, whereby the rubber stoppers are successively and continuously fitted on the respective wires. Also disclosed is an apparatus which may be suitably employed to carry out the above-described method. The apparatus includes an aligned stopper successively feeding section, a stopper transfer section, a rotary conveyor section, and a wire press-fitting section. The apparatus is further provided with an automatic control circuit adapted to allow the respective operations of the above-described secitons to be sequentially interlocked with each other.

5 Claims, 11 Drawing Sheets

METHOD OF FITTING RUBBER STOPPERS ON WIRES

This a division of U.S. patent application Ser. No. 722,228, filed Apr. 11, 1985, now U.S. Pat. No. 4,653,182.

BACKGROUND OF THE INVENTION

1. Field of the Invention:

The present invention relates to a method of and apparatus for fitting on an electric wire a rubber stopper or plug which is employed for a terminal of a waterproof connector.

2. Description of the Prior Art:

The insertion of an electric wire into a rubber stopper or plug employed for a terminal of a water-proof connector has heretofore been carried out by hand. Accordingly, the insertion operation involves extremely low productivity. In addition, the electric wire may be inserted into the rubber stopper in an incorrect direction or at an undesirably offset position, which fact may lead to disadvantageously low reliability in the quality of the product.

SUMMARY OF THE INVENTION

In view of the above-described disadvantages of the prior art, it is a primary object of the present invention to provide a novel method of and apparatus for fitting a rubber stopper which enables improved quality reliability and productivity with respect to a waterproof connector in which the rubber stopper is employed.

To this end, according to one aspect of the present invention, there is provided a method of fitting a rubber stopper for a water-proof connector terminal onto an end portion of an electric wire, the method comprising the steps of; successively feeding a group of rubber stoppers aligned in a row in a state wherein each of the rubber stoppers has its longitudinal axis extending vertically; transferring each of the rubber stoppers into a stopper housing portion; retaining the electric wire disposed on an imaginary line passing through the center of the stopper housing portion; and press-fitting the wire into the rubber stopper, whereby the rubber stoppers are successively and continuously fitted on the respective wires.

According to another aspect of the present invention, there is provided an apparatus for fitting a rubber stopper comprising: an aligned stopper successively feeding section having a parts feeder and a stopper successively feeding groove and adapted to successively feed a group of rubber stoppers aligned in a row; a stopper transfer section adapted to take out and transfer each of the rubber stoppers from the feeding groove; a rotary conveyor section having stopper housing portions disposed on the outer periphery of a rotary member at equal distances, a mechanism for effecting intermittent rotation and a mechanism for effecting forward and backward movement, the rotary conveyor section being adapted to receive each of the rubber stoppers from the stopper transfer section and to convey the rubber stopper; a wire press-fitting section having a wire retaining mechanism adapted to retain an electric wire on an imaginary line passing through the center of the stopper housing portion at one of the stations on the rotary conveyor section; and an automatic control circuit adapted to allow the respective operations of the above-described sections to be sequentially interlocked with each other.

The above and other objects, features and advantages of the present invention will become more apparent from the following description of the preferred embodiment thereof, taken in conjunction with the accompanying drawings.

DETAILED DESCRIPTION OF THE PREFERRED EMBODIMENTS

Figure 1A:
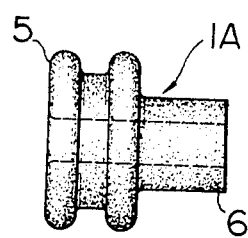
FIG. 1A is a front elevational view of a rubber stopper, which shows a typical example of the rubber stopper structure.

FIGS. 1A to 1C and FIGS. 2A to 2C respectively show typical examples of structures of terminal portions of water-proof connectors. In general, the terminal portion of a water-proof connector has, as shown in FIGS. 1A to 1C or 2A to 2C, a rubber stopper 1A or 1B which has a central bore 4 extending therethrough in the axial direction and an expanded portion 5 in its rearhalf part. The rubber stopper 1A or 1B is fitted on an electric wire 2, and a terminal 3 is press-fitted to a smaller-diameter cylindrical portion 6 formed in the front-half part of the rubber stopper 1A or 1B. Then, the expanded portion 5 is brought into resilient contact with the peripheral wall of the terminal housing chamber of the water-proof connector, thereby making the connector water-tight.

Since the above-described rubber stopper is fitted on the electric wire 2 by manual work, the operability is extremely low, and such a rubber stopper fitting method does not meet the requirements of any current mass-production system. Further, the conventional method disadvantageously involves generation of such defective products as those in which the electric wire has been inserted into the rubber stopper in an incorrect direction or the insertion position of the wire is undesirably offset, these defects occurring in the course of the manual work. Thus, the conventional rubber stopper fitting method involves disadvantageously low reliability in terms of the quality of the products as well as unfavorably low productivity.

A first embodiment of the present invention will be described hereinunder in detail with reference to FIGS. 3 to 10.

Figure 3:
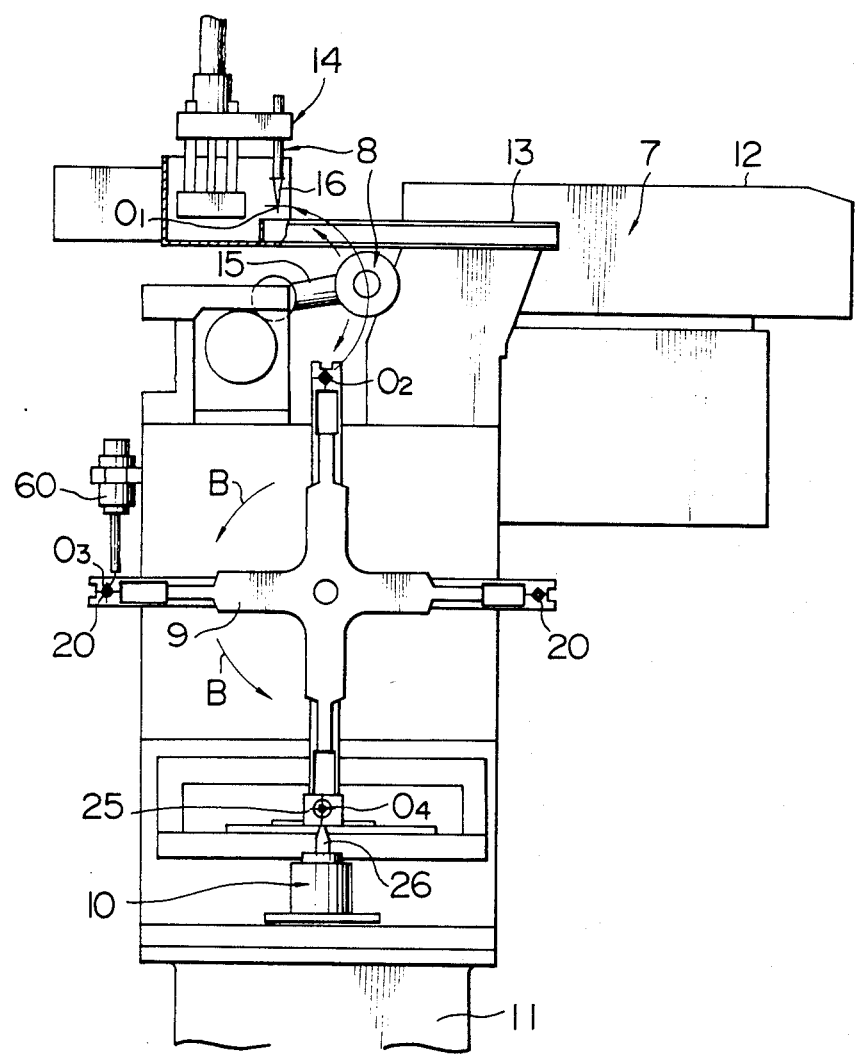
FIG. 3 is a front elevational view of a rubber stopper fitting apparatus in accordance with a first embodiment of the present invention.
Figure 4:
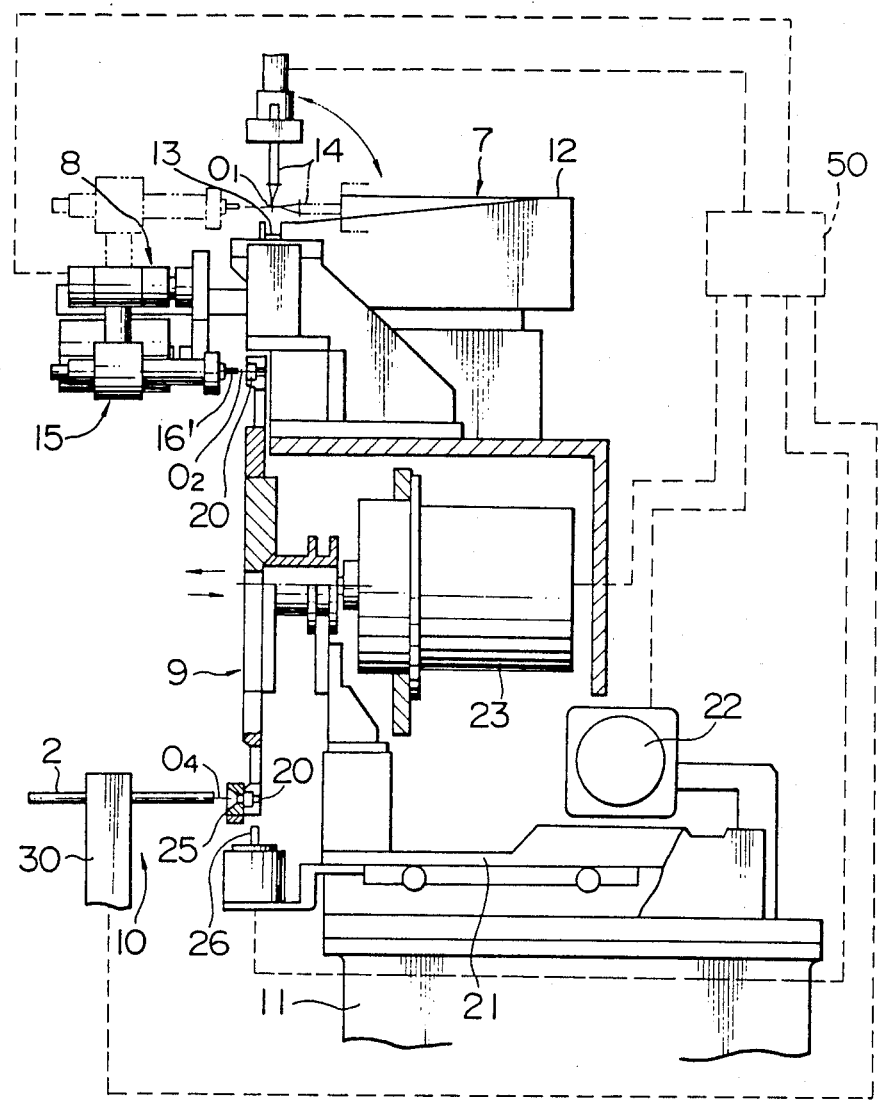
FIG. 4 is a side elevational view of the apparatus shown in FIG. 3.

FIGS. 3 and 4 are a front elevational view and a side elevational view, respectively, of a rubber stopper fitting apparatus in accoreance with the first embodiment, while FIGS. 5 to 10 show in detail various sections or portions of the rubber stopper fitting apparatus.

The rubber stopper fitting apparatus according to the present invention comprises the following various sections. An aligned stopper successively feeding section (referred to simply as the "stopper feeding section", hereinafter) 7 is constituted by a known parts feeder 12 and a stopper successively feeding groove 13 and is adapted to successively feed a group of rubber stoppers which are aligned in a row. A stopper transfer section 8 includes a retainer pin 16 which successively takes out rubber stoppers from the terminating end of the stopper feeding section 7. A rotary conveyor section 9 has stopper housing portions 20 disposed along its outer periphery, each of the stopper housing portions 20 being adapted to receive a rubber stopper from the stopper transfer section 8 in such a manner that the received rubber stopper is press-fitted into the housing portion 20. In addition, a wire press-fitting section 10 is provided at one station within the rotary conveyor section 9. The stopper feeding section 7, the stopper transfer section 8, the rotary conveyor section 9 and the wire press-fitting section 10 are all incorporated in a single frame 11 and organically connected together.

Figure 6:
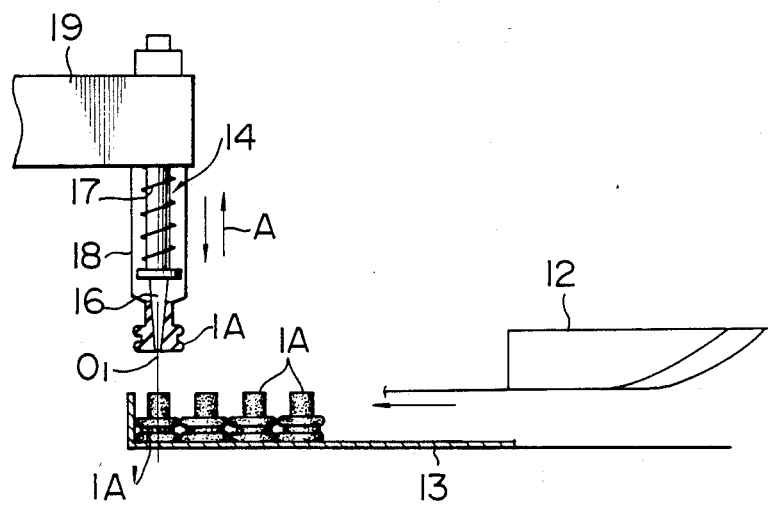
FIGS. 6 and 7 in combination show in detail respective essential portions of a stopper feeding section and a stopper transfer section in the first embodiment.
Figure 7:
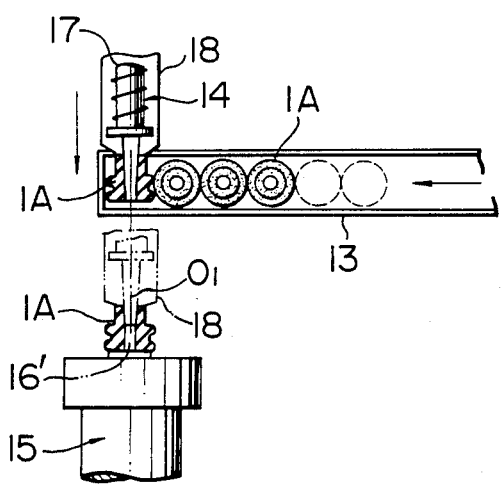

More specifically, the stopper feeding section 7 includes the parts feeder 12 which houses a group of rubber stoppers, and the stopper successively feeding groove 13 which is connected to the output side of the parts feeder 12 (see FIGS. 6 and 7). A group of rubber stoppers which are cast into the parts feeder 12 are successively fed out into the stopper successively feeding groove 13 in the same vertical direction and in a state wherein each rubber stopper has its expanded portion 5 down, the groove 13 having a width which enables the rubber stoppers toflow in a row. The rubber stoppers are then successively fed through the groove 13 in the state of being aligned in a row while closely contacting one another.

The stopper transfer section 8 is constituted by first and second transfer arms 14, 15. The first transfer arm 14 includes an arm member 19 which has the retainer pin 16 projecting directly above a position where it is in alignment with the central bore 4 of the endmost rubber stopper 1A' in the groove 13 in the manner shown in FIGS. 6 and 7. The whole of the first transfer arm 14 including the arm member 19 is movable in both upward and downward directions as viewed in Fig. 6, that is, the directions indicated by the arrow A, and is also pivotal between the solid-line position in Fig. 4 and the dotted-line position which is rotated 90° from the solid-line position in the forward direction, that is, the downward direction as viewed in FIG. 4. The retainer pin 16 has a sleeve-shaped stopper member 18 and is biased in the forward direction, that is, the downward direction as viewed in FIG. 6, by the action of a coiled spring 17 which is fitted on the retainer pin 16. Thus, the first transfer arm 14 is arranged such as to be able to press-fit the portion of the retainer pin 16 which projects from the stopper member 18 into the central bore 4 of the rubber stopper 1A' and to pick up and retain the rubber stopper 1A' and, further, it is possible for the retainer pin 16 to retract within the stopper member 18 against the biasing force of the coiled spring 17.

On the other hand, the second transfer arm 15 is constituted by a rotary arm member which has a retainer pin 16' at its distal end, the retainer pin 16' having the similar arrangement to that of the retainer pin 16 but being constructed to be retractable by the operation of a pin retractive mechanism. The retainer pin 16' is, as shown in FIG. 7, arranged such as to be able to oppose the retainer pin 16 of the first transfer arm 14 which has been rotated 90° from its position shown in FIG. 6 and to effect transfer of the rubber stopper 1A' at a predetermined position, that is, a transfer position $0_1$. The transfer arm 15 is rotatable between a solid line position in FIG. 4 and a dotted line position in FIG. 4.

More specifically, the first transfer arm 14 lowers together with the arm member 19 in one unit, and causes the retainer pin 16 to be press-fitted into the central bore 4 of the endmost rubber stopper 1A' in the stopper successively feeding groove 13. After picking up the rubber stopper 1A' in the manner shown in FIG. 6, the first transfer arm 14 is rotated 90° as shown in FIG. 7. When the first transfer arm 14 advances as far as the dotted-line position in FIG. 7, the opposing retainer pins 16 and 16' come in contact with each other. At that time, the retainer pin 16 of the first transfer arm 14 alone is moved rearwardly, that is, in the upward direction as viewed in FIG. 7, by the reaction which results from the above-described contacting action. In consequence, the rubber stopper 1A' is pushed out by virtue of the stopper member 18 and is transferred to the retainer pin 16' of the second transfer arm 15 which is not retracted at this stage. Subsequently, the second transfer arm 15 is directly rotated 120° in the downward direction as viewed in Fig. 7 such as to be positioned at a transfer position $O_2$ shown in FIG. 3 where the rubber stopper 1A' is transferred to the rotary conveyor section 9.

The rotary conveyor section 9 is constituted by a rotary member which is provided on the front side of the frame 11, the rotary member having the stopper housing portions 20 respectively disposed at the distal end portions of four arm members connected in the shape of a cross, the distal end portions being respectively located at positions which are defined by dividing a circle into four equal sections. The rotary conveyor section 9 is mounted on a slide member 21 and includes a drive unit 23 for intermittently rotating the rotary conveyor section 9 and a drive unit 22 for moving the rotary conveyor section 9 both forwardly and backwardly. The arrangement is such that the rotary conveyor section is able to intermittently rotate exactly by 90° in the direction of the arrow B shown in FIG. 3 as well as to move both forwardly and backwardly (rightwardly and leftwardly as viewed in FIG. 4) by a necessary stroke with respect to the frame 11.

Figure 5A:
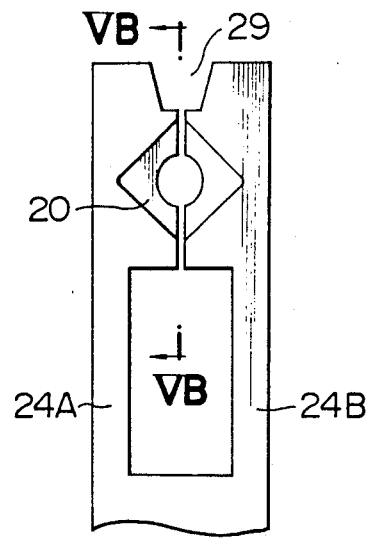
FIG. 5A, is a front elevational view of a part of a rotary conveyor section in the first embodiment.
Figure 5B:
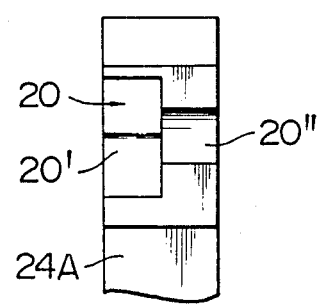
FIG. 5B is a sectional view taken along the line 5B—5B of FIG. 5A.

The stopper housing portions 20 are, as shown in FIGS. 3, 5A and 5B, disposed at the respective radially outward positions of the rotary conveyor section 9. Each of the portions 20 is provided in the form of a split cavity-like space which enables a rubber stopper 1A to be press-fitted therein, the space being defined by the respective distal ends of a pair of opposing bar-shaped spring members 24A and 24B. The stopper housing portion 20 is constituted by two spaces 20' and 20", the space 20' having a square cross-section and adapted to house the expanded portion 5 of the rubber stopper 1A, and the space 20" having a circular cross-section and adapted to house the smaller-diameter cylindrical portion 6 of the rubber stopper 1A. The diameter of the inscribed circle of the space 20' and the diameter of the space 20" in a free state are made slightly smaller than the respective diameters of the corresponding portions of the rubber stopper 1A housed therein. The arrangement is such that, when the rotary conveyor section 9 stops after rotating exactly 90°, the first station at the uppermost position of the section 9 is placed at the transfer position $O_2$; the second station which precedes the first station is placed at a detection position $O_3$; and the third station at the lowermost position of the section 9 is placed at a wire press-fitting position $O_4$.

Figure 8:
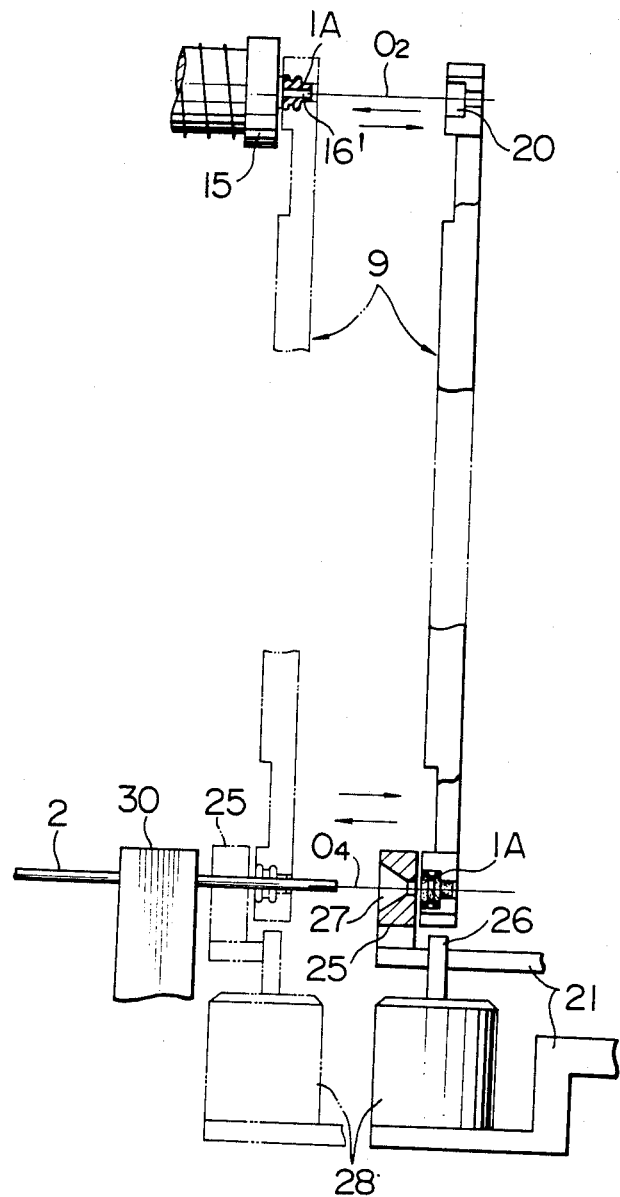
FIG. 8 is a view employed to describe the respective arrangements and functions of the rotary conveyor section and a wire press-fitting section in the first embodiment.

The wire press-fitting section 10 is, as shown in FIG. 8, provided with a wire retaining mechanism on an imaginary horizontal line which passes through the wire press-fitting position $O_4$, the wire retaining mechanism being adapted to fixedly retain the wire 2 which is to be inserted into the rubber stopper 1A by a proper means, for example, a clamping member 30. The wire press-fitting section 10 is further provided with a guide member 25 and a wedge member 26, the guide member 25 being disposed in front of the stopper housing portion 20 which is placed on the imaginary horizontal line passing through the position $O_4$, and the wedge member 26 being disposed directly below the stopper housing portion 20 at the position $O_4$. Each of the stopper housing portions 20 has a fitting recess 29 (see FIG. 5A) formed at its outer peripheral portion, the recess 29 allowing the distal end of the wedge member 26 to be forcedly fit therein. The guide member 25 and the wedge member 26 are mounted on the slide member 21 and are therefore able to move both forwardly and backwardly together with the rotary conveyor section 9.

Figure 9:
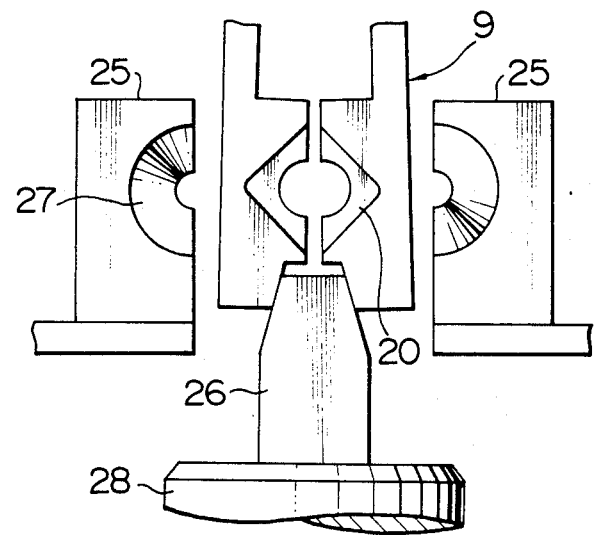
FIG. 9 is a front elevational view showing the arrangement of a topper housing portion, a guide member and a wedge member employed in the first embodiment.
Figure 10:
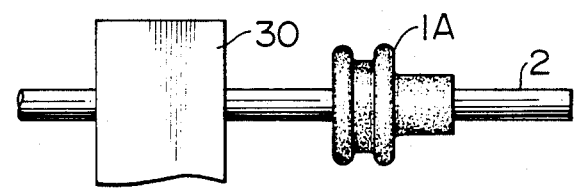
FIG. 10 is a front elevational view of a rubber stopper in a state wherein it is fitted on an electric wire.

The guide member 25 is, as shown in FIGS. 8 and 9, constituted by a pair of right and left guide member poritons which are formed as separate members. The guide member 25 is provided with an opening mechanism by which, when both the guide member portions are connected together, they define a funnel-shaped guide bore 27 which guides the insertion of the electric wire 2; when the rubber stopper 1A into which the electric wire 2 has been inserted passes therethrough, the guide member portions are separated from each other in the rightward and leftward directions, respectively, so as to allow the passage of this rubber stopper 1a. On the other hand, the wedge member 26 has a lifting mechanism 28 and moves vertically. The wedge member 26 is arranged such that, when it rises, the wedge member 26 forcedly fits into the recess 29 formed at the outer peripheral portion of each of the stopper housing portions 20 of the rotary conveyor section 9 such as to forcibly expand the stopper housing portion 20 which is constituted by the pair of spring members 24A and 24B.

The rotary conveyor section 9 and the wire press-fitting section 10 which are arranged as above operate as follows.

Referring to FIG. 8, when the rotary conveyor section 9 stops after rotating exactly 90° and advances to the dotted-line position shown in the Figure, at the transfer position $O_2$ the rubber stopper 1A retained by the retainer pin 16' of the second transfer arm 15 standing by on an imaginary horizontal line passing through the transfer position $O_2$ is press-fitted into the stopper housing portion 20 of the rotary conveyor section 9 which is placed at the transfer position $O_2$. At this time, the pair of spring members 24A and 24B which in combination define the stopper housing portion 20 are elastically deformed outwardly as the result of the press-fitting of the rubber stopper 1A and resiliently clamp the rubber stopper 1A press-fitted therebetween. At the same time as the completion of this press-fitting operation, the retainer pin 16' is retracted by the pin retracting mechanism which is incorporated in the second transfer arm 15, whereby the rubber stopper 1A is completely separated from the second transfer arm 15 such as to be transferred to the stopper housing portion 20.

Simultaneously with the above-described operation at the transfer position $O_2$, the slide member 21 advances in such a manner that the distal end of the electric wire 2 which is retained on the imaginary horizontal line passing through the wire press-fitting position $O_4$ by a wire clamping mechanism, such as the clamping member 30, is guided by the guide member 25 and is forcedly passed through the central bore 4 of the rubber stopper 1A within the stopper housing portion 20 placed at the position $O_4$, whereby the rubber stopper 1A is fitted on the wire 2. At the same time as the completion of the insertion of the wire 2, the guide member 25 is opened, that is, the guide member portions which constitute the guide member 25 are separated from each other by the action of the opening mechanism, thereby allowing the passage of the rubber stopper 1A fitted on the wire 2. Further, simultaneously with the above-described operation, the wedge member 26 forcedly fits into the fitting recess 29 such a to expand the stopper housing portion 20, thereby enabling the rubber stopper 1A to be smoothly removed from the stopper housing portion 20. Subsequently, the rotary conveyor section 9 retracts to its previous position shown by the solid line in FIG. 8. Thus, it is possible to obtain the wire 2 having the rubber stopper 1A fitted thereon in a normal and correct position and posture, such as that shown in FIG. 10.

It is to be noted that a sensor 60 is mounted at the second station, that is, the detecting position $O_3$ of the rotary conveyor section 9 in the manner shown in FIG. 3. The sensor 60 is adapted to check as to whether or not the rubber stopper 1A has been pressfitted in the stopper housing portion 20.

In addition, the rubber stopper fitting apparatus incorporates an automatic control circuit 50 which enables the respective operations of the stopper transfer section 8, the rotary conveyor section 9 and the wire press-fitting section 10 to be repeated in synchronism with each other so that rubber stoppers 1A are automatically and continuously fitted one by one on respective wires 2.

Figure 11:
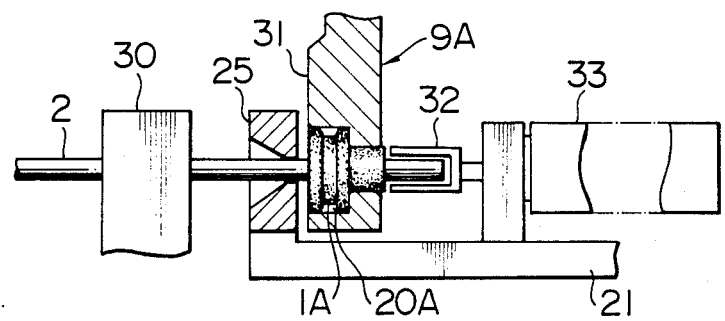
FIG. 11 is a partly-sectioned front elevational view of a modification of the first embodiment.

The following is a description of a modification of the above-described first embodiment with reference to FIG. 11.

The rubber stopper fitting apparatus in accordance with this modification has the same arrangement as that of the one described above except for the following portions. According to this modification, in place of the resilient and split cavity-like stopper housing portions 20 and the expanding mechanism which is constituted by the wedge member 26, each of the stopper housing portions 20a is provided rigidly (not in the form of a split cavity) at the distal end of the corresponding one of the arms constituting the rotary conveyor section 9A and is adapted to receive a rubber stopper 1A which is to be press-fitted therein in the manner shown in FIG. 11. Further, an ejector pin mechanism 33 is provided on the slide member 21 at the rear of the stopper housing portion 20A at the wire pressfitting position 0₄. The arrangement is such that, when the rotary conveyor section 9A is retracted, the ejector pin mechanism 33 causes an ejector pin 32 to be pushed out into the stopper housing portion 20 at a speed equal to the retracting speed of the rotary conveyor section 9A, thereby allowing the rubber stopper 1A to be smoothly removed.

The rubber stopper fitting apparatus in accordance with the above-described first embodiment permits rubber stoppers 1A to be successively and continuously fitted on the required positions of the respective end portions of wires 2, each of the rubber stoppers 1A being fitted in a normal and stable posture, by casting a group of rubber stoppers 1A into the parts feeder 12 and continuously feeding the wire 2 to the wire pressfitting section 10.

Accordingly, the productivity of the products is greatly improved as compared with that by the conventional hand work. Further, it is possible to unfailingly prevent any generation of such defective products as those in which the electric wire is inserted into the rubber stopper in an incorrect direction or the insertion position of the wire is undesirably offset. Thus, it is possible to improve reliability in the quality of the products. Additionally, with automation of the rubber stopper fitting operation, it becomes possible to fully automate a series of systems for processing the electric wire for water-proof connectors.

In particular, the rubber stopper fitting apparatus according to the present invention includes the rotary conveyor section 9 which has the stopper housing portions 20 disposed along the outer periphery of the rotary member, whereby each of the rubber stoppers is conveyed while being retained in a press-fit state and the press-fitted rubber stopper is smoothly removed. It is therefore possible for the apparatus to stably continue the operation of fitting the rubber stopper 1A at a necessary position on the wire 2, the stopper 1A being fitted in a correct posture. Further, it becomes possible to simultaneously conduct the various operations, such as the detection and the pressfitting of the wire 2, which are carried out at the respective stations on the rotary member which constitutes the rotary conveyor section 9. As a result, the processing tact of the rubber stopper fitting operation is advantageously reduced, and the operating effeciency is favorably improved.

Figure 1B:
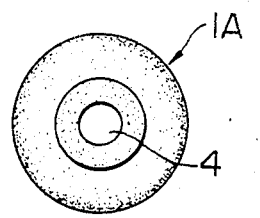
FIG. 1B is a side elevational view of the rubber stopper shown in FIG. 1A.
Figure 1C:
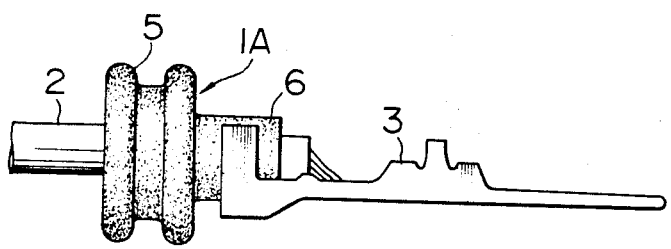
FIG. 1C is a front elevational view of the rubber stopper shown in FIG. 1A in its used state.
Figure 2A:
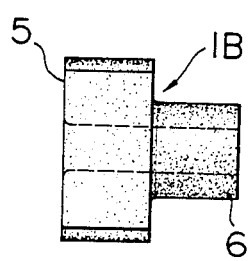
FIG. 2A is a front elevational view of another rubber stopper, which shows another typical example of the rubber stopper structure.
Figure 2B:
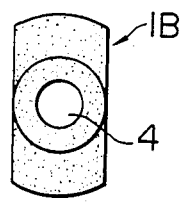
FIG. 2B is a side elevational view of the rubber stopper shown in FIG. 2A.
Figure 2C:
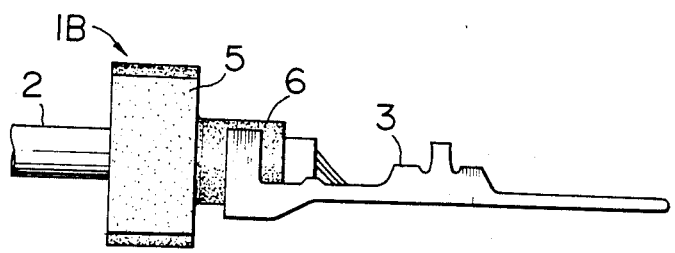
FIG. 2C is a front elevational view of the rubber stopper shown in FIG. 2A in its used state.

It is to be noted that, although the embodiment has been described with respect to the rubber stopper 1A having the expanded portion 5 with a circular cross-section, such as that shown in Figs. 1A to 1C, the same action and effect as are described above are also offered with respect to the rubber stopper 1B having the expanded portion 5 with a rectangular cross-section such as that shown in FIGS. 2A to 2C by designing the shape of each of the stopper housing portions 20 such as to match the shape of the rubber stopper 1B.

As has been described above, the present invention overcomes the problems of the prior art and provides a rubber stopper fitting apparatus which greatly improves the quality reliability of the products and the productivity thereof.

Figure 12:
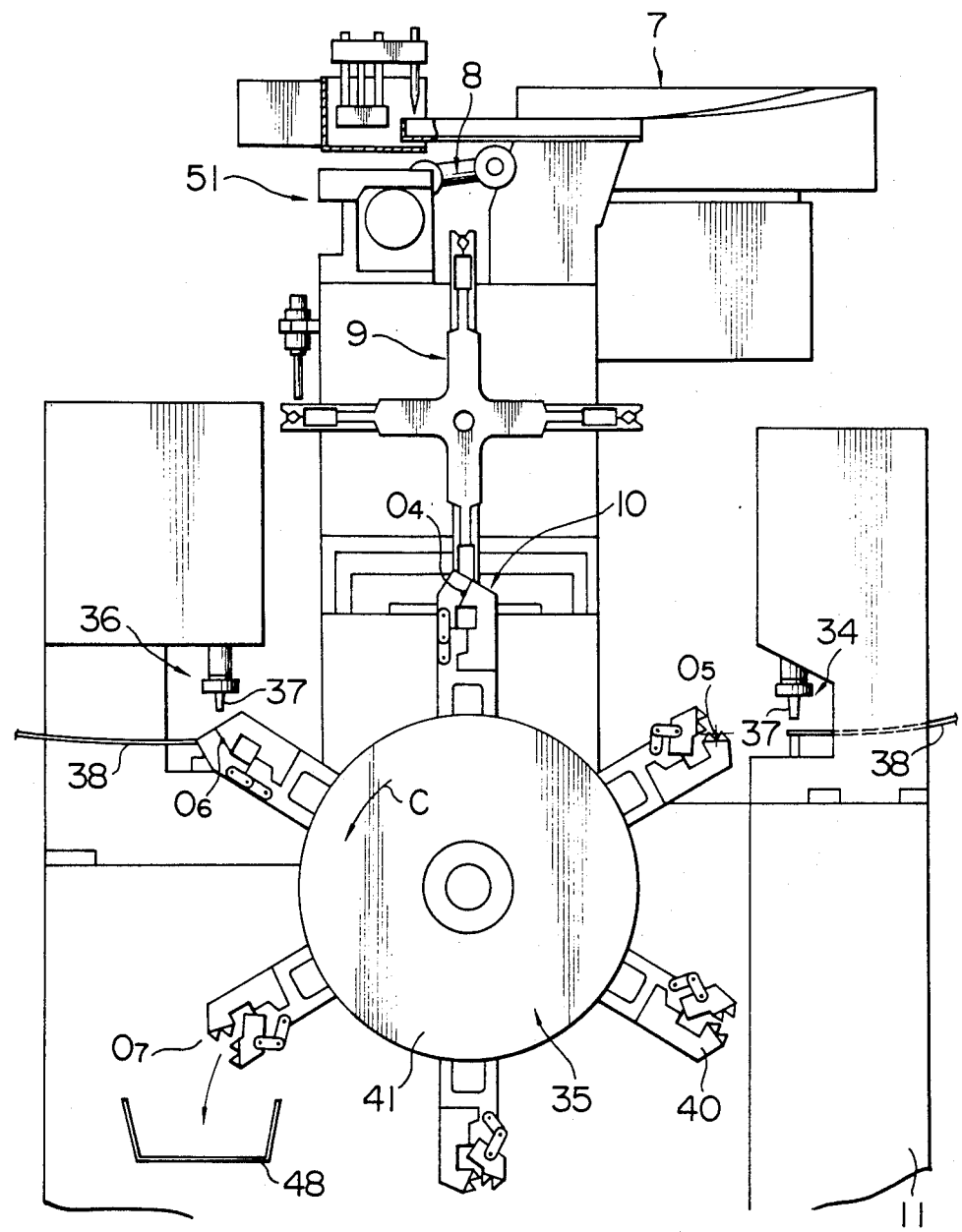
FIG. 12 is a front elevational view of a rubber stopper fitting apparatus in accordance with a second embodiment of the present invention.
Figure 13:
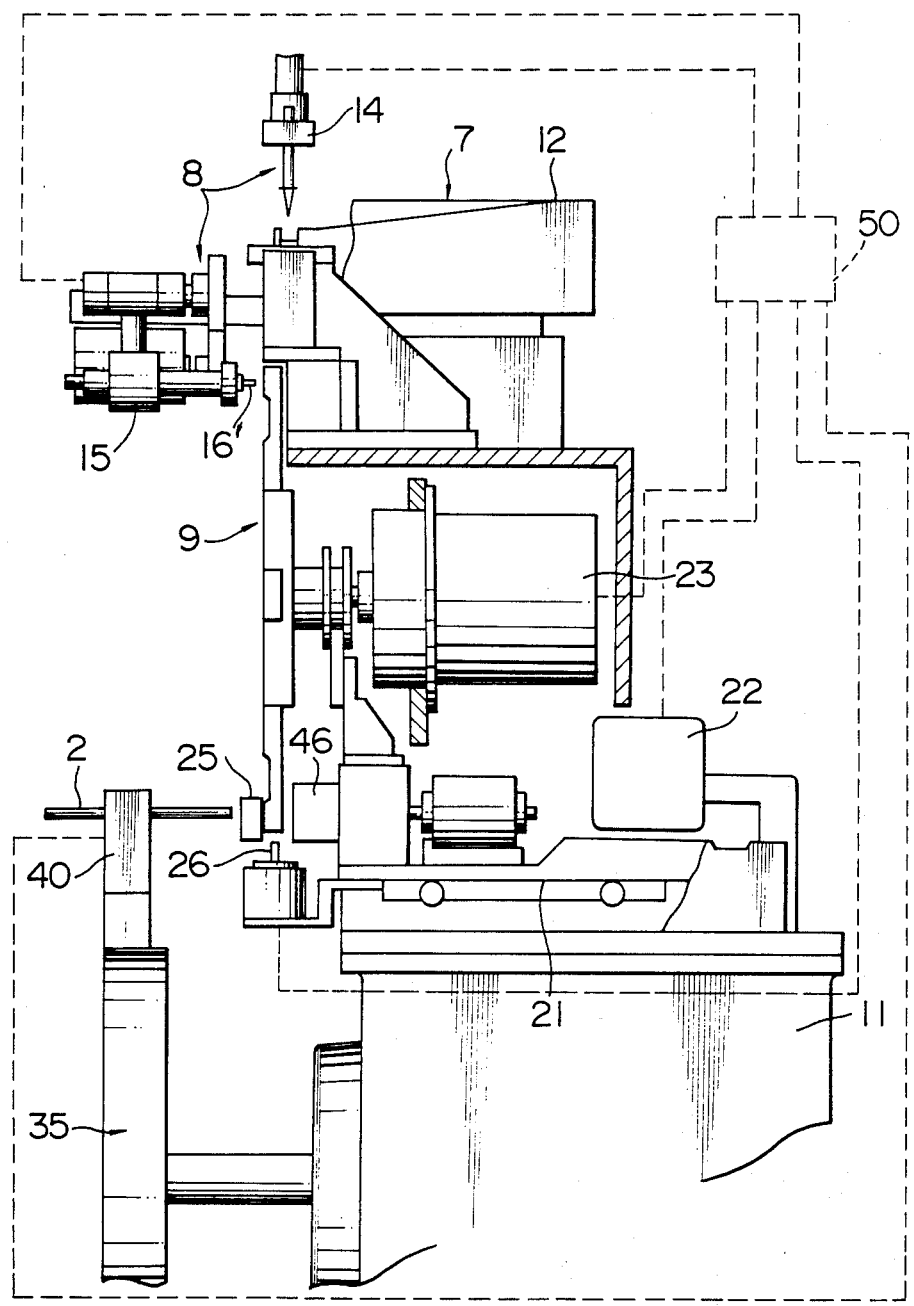
FIG. 13 is a side elevational view of the apparatus shown in FIG. 12.
Figure 14:
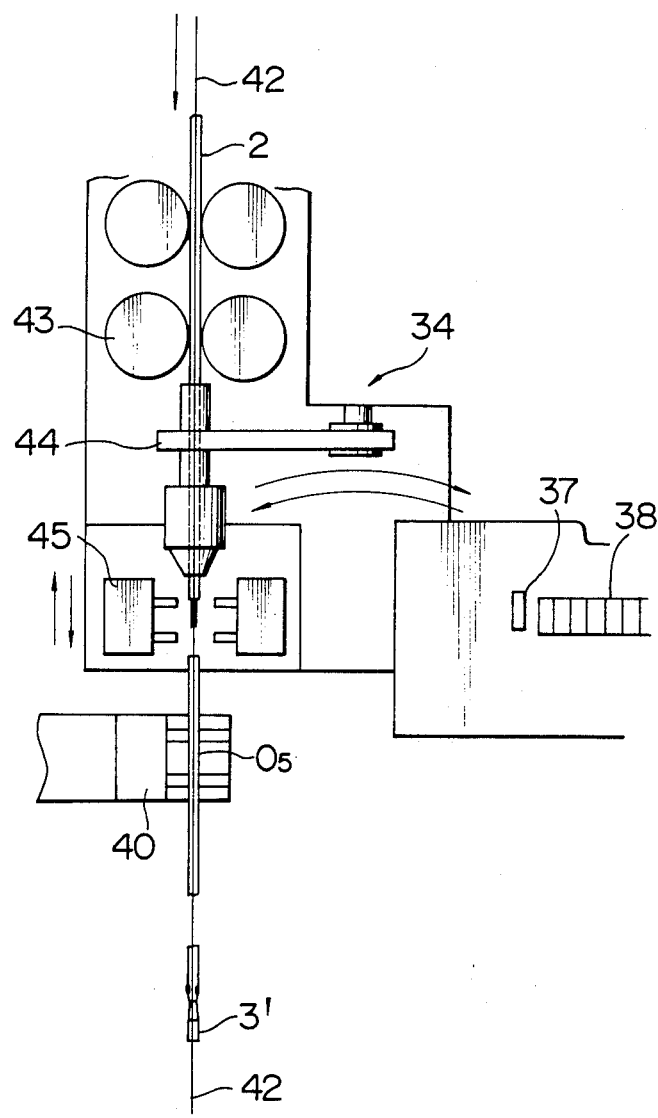
FIG. 14 is a plan view of an A-end terminal press-fitting section in the second embodiment.
Figure 15:
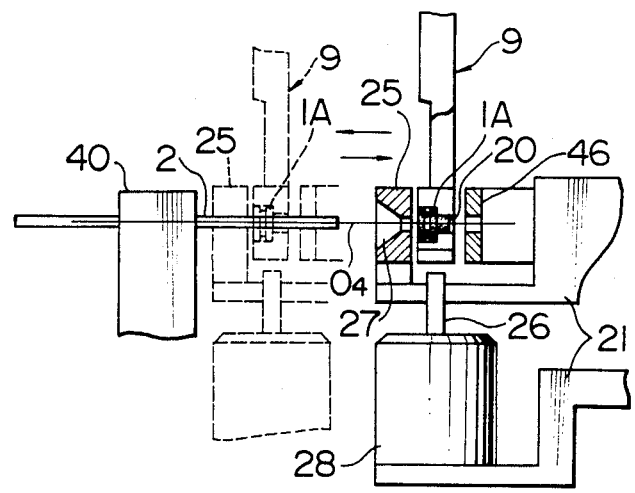
FIGS. 15 and 16 in combination show the wire press-fitting section in the second embodiment.
Figure 16:
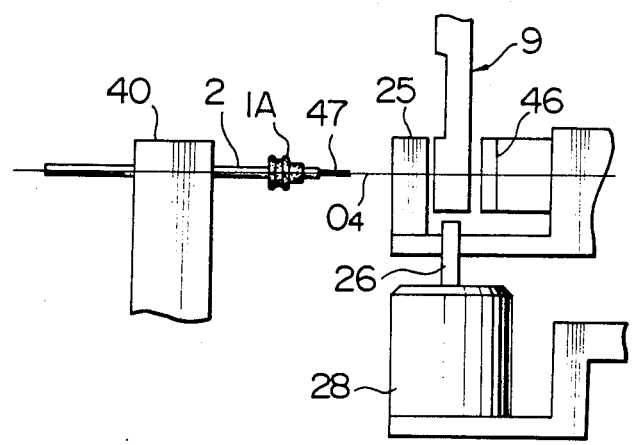

A rubber stopper fitting apparatus in accordance with a second embodiement of the invention which automatically press-fits a water-proof connector terminal will now be described with reference to FIGS. 12 to 16, in which: FIG. 12 is a front elevational view of the rubber stopper fitting apparatus; FIG. 13 is a side elevational view of the apparatus shown in FIG. 12; Fig. 14 is an enlarged view of an essential portion of the apparatus; and FIGS. 15 and 16 are views employed to describe the operation of an essential portion of the apparatus. As shown in the drawings, the rubber stopper fitting apparatus in accordance with the second embodiment includes a fitting apparatus body 51, an A-end terminal press-fitting section 34 connected to the input side of the fitting apparatus body 51, and a B-end terminal press-fitting section 36 connected to the output side of the fitting apparatus body 51 (the A-end denotes one of the ends of an electric wire at which a terminal is to be press-fitted, while the B-end represents the other end; the terminal press-fitting section will be referred to simply as the "press-fitting section", hereinafter). The fitting apparatus body 51 includes the stopper feeding section 7, the stopper transfer section 8, the rotary conveyor section 9, the wire pressfitting section 10 and a rotary transfer section 35. the respective arrangements and operations of the stopper feeding section 7, the stopper transfer section 8, the rotary conveyor section 9 and the wire pressfitting section 10 are all the same as those of the corresponding sections in the above-described first embodiment shown in FIGS. 3 to 10 except for a B-end scalping mechanism, described later, which is annexed to the wire press-fitting section 10.

The rotary transfer section 35 is constituted by a multiplicity (six, in the illustrated example) of chucking arms 40 which project radially from the outer periphery of a disk 41 at equal distances, the disk 41 being mounted on the front side of the lower part of the frame 11. The rotary transfer section 35 is arranged such that each of the chucking arms 40 intermittently rotates exactly 60° in the direction of the illustrated arrow C while clamping the electric wire 2 which is to be inserted into a rubber stopper, whereby the wire 2 is transferred from the A-end press-fitting section 34 to the wire press-fitting section 10 and further from the wire press-fitting section 10 to the B-end press-fitting section 36. More specifically, the distal end of each chucking arm 40 is adapted to be opened and closed as desired. The chucking arm 40 clamps the wire 2 which has a terminal press-fitted to its A-end at a station 0₅ which is immediately before the top dead center position of the rotary transfer section 35. At the top dead center position, the chucking arm 40 retains the clamped wire 2 on the imaginary horizontal line passing through the wire press-fitting position O₄ and allows the wire 2 to be inserted into a rubber stopper. At the subsequent station O₆, a terminal is press-fitted to the rubber stopper fitted on the wire 2 at its B-end. At the subsequent station O7, the chucking arm 40 is opened, and the wire 2 is thereby discharged such as to fall onto a discharge conveyor 48 or other similar means.

In other words, the rotary transfer section 35 constitutes a transfer section which transfers the wire 2 from the A-end press-fitting section 34 to the B-end press-fitting section 36 via the wire press-fitting position O4. The rotary transfer section 35 also serves at the wire press fitting position O4 as a wire retaining mechanism for the wire press-fitting section 10 which retains the clamped wire 2 on the imaginary horizontal line passing through the position O4.

Moreover, the forward and backward action mechanism constituted by the slide member 21 and the forward and backward movement drive unit 22 in the rotary conveyor section 9 serves as a mechanism for moving the wire 2 and the stopper housing portion 20 relative to each other at the wire press-fitting section 10.

Further, as shown in FIGS. 15 and 16, the wire press-fitting section 10 includes a B-end scalping unit 46 disposed in close proximity to the rear side of the stopper housing portion 20 at the wire press-fitting position O4, the B-end scalping unit 46 having a known scalping edge and being secured to the slide member 21. The B-end scalping unit 46 is moved relative to the wire 2 by the action of the above-described relative movement mechanism. During the wire press-fitting operation at the position O4, the B-end scalping unit 46 clamps the B-end portion of the wire 2 passing through the stopper housing portion 20 and projecting therefrom and produces a scalped portion 47 on the wire 2 retained by the wire retaining mechanism when the B-end scalping unit 46 is moved backwardly.

On the other hand, the A-end press-fitting section 34 is, as shown in FIG. 14 in plan view, composed of quantitative feed rollers 43, a cutting and scalping unit 45, a press-fitting punch 37, a terminal successively feeding unit 38 and a transfer arm 44, thereby constituting a terminal press-fitting mechanism with a known structure. The wire 2 is intermittently fed out by a necessary length on a delivery line 42 and is cut and scalped at its A-end by the cutting and scalping unit 45. The wire 2 thus cut and scalped is then conveyed to a position directly below the press-fitting punch 37 by the transfer arm 44, where an A-end terminal 3' which requires no rubber stopper is press-fitted to the A-end portion of the wire 2. Subsequently, the wire 2 is returned onto the delivery line 42 and is fed out again such as to be clamped at its B-end portion by the chucking arm 40 of the rotary transfer section 35 which is standing by at the clamping station O5.

On the other hand, the B-end press-fitting section 36 is provided with a known press-fitting punch 37 and a terminal successively feeding unit 38. The B-end press-fitting section 36 is adapted to receive the B-end portion of the wire 2 which is being clamped by the chucking arm 40 and stops at the B-end press-fitting position O6. The B-end press-fitting section 36 then accurately positions a water-proof connector terminal 3 on the smaller-diameter cylindrical portion 6 of the rubber stopper 1A fitted on the wire 2 and press-fits the terminal 3 to the portion 6.

In addition, the above-described rubber stopper fitting appartus incorporates the automatic control circuit 50 which allows the respective operations of the fitting apparatus body 51, the A-end press-fitting section 34 and the B-end press-fitting section 36 to be interlocked with each other sequentially and organically.

It is to be noted that, although the above second embodiment has been described with respect to the rubber stopper 1A having the expanded portion 5 with a circular cross-section such as that show in FIGS. 1A to 1C, it is also possible to obtain the same action and effect as those of the rubber stopper 1A with respect to the rubber stopper 1B having the expanded portion 5 with a rectangular cross-section such as that shown in FIGS. 2A to 2C, as detailed in the following. In the case of the rubber stopper 1B, the shape of each of the stopper housing portions 20 is designed such as to match the shape of the rubber stopper 1B, and the angle of rotation of the second transfer arm 15 of the stopper transfer section 8 is precisely set at 120°, while the angle of rotation of the rotary transfer section 35 between the adjacent stations is precisely set at 60°. In consequence, the total degree of rotation of the rubber stopper 1B during transfer within the fitting apparatus body 51 is 180°; therefore, it is possible to supply the rubber stopper 1B to the B-end press-fitting section 36 in a state wherein the longer sides of the expanded portion 5 which has a rectangular cross-section extend vertically. Accordingly, it is possible to correctly press-fit a terminal to the rubber-stopper 1B.

The rubber stopper fitting apparatus in accordance with the second embodiment, arranged as above, makes it possible to fully automate a series of manufacturing processes, such as the cutting of the wire for a waterproof connector, the press-fitting of the terminal to the A-end portion, the fitting of the rubber stopper on the B-end portion, and the press-fitting of the terminal to the B-end portion. It is therefore possible to greatly improve the productivity of the products and to expect an improvement in reliability in terms of the quality of the products as a result of the automation.

It is to be noted that the rubber stopper fitting apparatus according to the present invention is not necessarily limitative with respect to the abovedescribed embodiments and various changes and modifications may be imparted thereto by employing known mechanical means without departing from the scope of the invention which is limited solely by the appended claims. For example, the stopper housing portions may be of the fixed type. The B-end scalping unit may be provided in the B-end press-fitting section. The wire transfer section may be changed into a split-type transfer section which employs the wire press-fitting position 04 as a relay position. Further, the relative movement mechanism which is provided in the wire press-fitting section in accordance with the above-described embodiment may be disposed on the wire retaining side of the apparatus.

What is claimed is:

1. A method of fitting a rubber stopper having an axially extending opening with differently configured end portions for a water proof connector terminal onto an end portion of an electric wire, said method comprising the steps of:

sucessively feeding and aligning a group of rubber stoppers in a row in a state wherein the end portions of each of said rubber stoppers is similarly oriented and wherein said stoppers have their openings extending parallel to each other and extending in the same direction;

inserting a pin into one end of the axially extending opening of said stoppers to pick up said stoppers, transferring said stoppers onto another pin extending through the other end of said axially extending opening;

transferring said rubber stoppers from said another pin into a stopper housing portion;

retaining said electric wire disposed on an imaginary line passing through the center of said stopper housing portion; and press-fitting said wire into said rubber stopper through said other end of said axially extending opening, whereby said rubbber stoppers are sucessively and continuously fitted on the respective wires.

2. A method as set forth in claim 1, wherein one of the end portions is larger than the other of the end portions for insertion in sealing engagement into an opening formed in a wall of a connector housing and wherein the larger portions are fed and aligned in a vertical direction beneath the other end portions.

3. A method as set forth in claim 1, further including the steps of reorienting the stoppers prior to insertion into the stopper housing portion.

4. A method as set forth in claim 3, wherein the rubber stoppers are reoriented when supported upon the another pin.

5. A method as set forth in claim 4, wherein one of the end portions is larger than the other of the end portions for insertion in sealing engagement into an opening formed in a wall of a connector housing and wherein the larger portions are fed and aligned in a vertical direction beneath the other end portions.

* * * * *

UNITED STATES PATENT AND TRADEMARK OFFICE
CERTIFICATE OF CORRECTION

PATENT NO. : 4,765,052
DATED : August 23, 1988
INVENTOR(S) : Fukuda et al

It is certified that error appears in the above-identified patent and that said Letters Patent is hereby corrected as shown below:

On the title page

Under Foreign Application Priority Data:

"Serial No. 56391/84" should read -- 56392/84 --.

Signed and Sealed this

Twenty-first Day of November, 1989

Attest:

JEFFREY M. SAMUELS

Attesting Officer     Acting Commissioner of Patents and Trademarks